United States Patent
Onoda

(10) Patent No.: US 10,803,079 B2
(45) Date of Patent: Oct. 13, 2020

(54) TIMING-BASED SYSTEM-PERIOD TEMPORAL TABLE IN A DATABASE SYSTEM

(71) Applicant: International Business Machines Corporation, Armonk, NY (US)

(72) Inventor: Yasuhiro Onoda, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 597 days.

(21) Appl. No.: 15/659,099

(22) Filed: Jul. 25, 2017

(65) Prior Publication Data

US 2019/0034502 A1    Jan. 31, 2019

(51) Int. Cl.
    *G06F 16/25* (2019.01)
    *G06F 16/22* (2019.01)

(52) U.S. Cl.
    CPC .......... *G06F 16/25* (2019.01); *G06F 16/2282* (2019.01)

(58) Field of Classification Search
    CPC .............................. G06F 16/2282; G06F 16/25
    See application file for complete search history.

(56) References Cited

U.S. PATENT DOCUMENTS

| | | | |
|---|---|---|---|
| 7,970,742 B2 | 6/2011 | Hanckel et al. | |
| 8,301,934 B1 | 10/2012 | Ramesh et al. | |
| 8,346,714 B1 * | 1/2013 | Ramesh | G06F 16/254 |
| | | | 707/600 |
| 8,706,769 B1 * | 4/2014 | Gao | G06F 16/2282 |
| | | | 707/796 |
| 9,235,617 B1 * | 1/2016 | Blackwell, Jr. | G16H 10/60 |
| 9,262,491 B2 | 2/2016 | Nambiar et al. | |
| 9,384,222 B2 | 7/2016 | Banerjee et al. | |
| 9,483,512 B2 * | 11/2016 | Schreter | G06F 16/221 |

(Continued)

OTHER PUBLICATIONS

"Updating Data in a System-Period Temporal Table", IBM Knowledge Center, [online], [retrieved on Nov. 24, 2016]. Retrieved from the Internet <URL: https://www.ibm.com/support/knowledgecenter/SSEPGG_10.5.0./com.ibm.db2.luw.admin.dbobj.doc/doc/t0058928.html>.

(Continued)

*Primary Examiner* — Richard L Bowen
(74) *Attorney, Agent, or Firm* — Law Offices of Ira D. Blecker, P.C.

(57) ABSTRACT

A method of querying data including: providing a transaction management table; providing a system-period temporal table; assigning a unique identifier to a transaction; performing a first operation at a first timestamp; writing a first row identifier in the system-period temporal table; writing in the row corresponding to the first row identifier the unique identifier of the first operation in the row begin entry of the system-period temporal table; writing in the row corresponding to the first row identifier a dummy transaction identifier corresponding to a maximum timestamp value of the database system in the row end entry of the system-period temporal table; committing the transaction at a commit timestamp such that the commit timestamp is later than the first timestamp; inserting a row in the transaction management table and inserting values for the unique transaction identifier, the first timestamp and the commit timestamp in the transaction management table.

18 Claims, 11 Drawing Sheets

TIME12
ROW A IS INSERTED INTO THE SYSTEM-PERIOD TEMPORAL TABLE

(56) References Cited

U.S. PATENT DOCUMENTS

| | | | |
|---|---|---|---|
| 9,747,313 B2* | 8/2017 | Kaufmann | G06F 16/2228 |
| 9,952,931 B2* | 4/2018 | Larson | G06F 11/1441 |
| 2019/0004851 A1* | 1/2019 | Doshi | G06F 9/3842 |

OTHER PUBLICATIONS

"Log Record Header", IBM Knowledge Center, [online], [retrieved on Jan. 5, 2017]. Retrieved from the Internet <URL: https://www.ibm.com/support/knowledgecenter/SSEPGG_11.1.0/com.ibm.db2.luw.apdv.api.doc/doc/r0024864.html>.

"Manage Retention of Historical Data in System-Versioned Temporal Tables", [online], [retrieved on Nov. 24, 2016]. Retrieved from the Internet <URL: https://msdn.microsoft.com/en-IN/library/mt637341.aspx>.

"Querying System-Period Temporal Data", IBM Knowledge Center, [online], [retrieved on Nov. 24, 2016], Retrieved from the Internet <URL: https://www.ibm.com/support/knowledgecenter/SSEPGG_10.5.0/com.ibm.db2.luw.admin.dbobj.doc/doc/t0058930.html>.

"System-period temporal table timestamp value conflicts", IBM Knowledge Center, [online], [retrieved on Jan. 5, 2017]. Retrieved from the Internet <URL: https://www.ibm.com/support/knowledgecenter/ssw_ibm_i_73/rzahf/rzahftmprlconflicts.htm>.

\* cited by examiner

TIME12
ROW A IS INSERTED INTO THE SYSTEM-PERIOD TEMPORAL TABLE

TRANSACTION MANAGEMENT TABLE (64)

| T_ID (70) | T_FIRST_TS (72) | T_LAST_TS (74) | T_COMMIT_TS (76) |
|---|---|---|---|
| DMYMAX | $T_{MAX}$ | $T_{MAX}$ | $T_{MAX}$ |

SYSTEM-PERIOD TEMPORAL TABLE (66)

| ROW (78) | DATA (80) | ROW BEGIN (82) | ROW END (84) |
|---|---|---|---|
| A | ******** | T1 | DMYMAX |

HISTORY TABLE (68)

| ROW (86) | DATA (88) | ROW BEGIN (90) | ROW END (92) |
|---|---|---|---|
|  |  |  |  |

FIG. 5

TIME13
ROW B IS INSERTED INTO THE SYSTEM-PERIOD TEMPORAL TABLE

| TRANSACTION MANAGEMENT TABLE | | | |
|---|---|---|---|
| T_ID | T_FIRST_TS | T_LAST_TS | T_COMMIT_TS |
| DMYMAX | $T_{MAX}$ | $T_{MAX}$ | $T_{MAX}$ |

| SYSTEM-PERIOD TEMPORAL TABLE | | | |
|---|---|---|---|
| ROW | DATA | ROW BEGIN | ROW END |
| A | ******** | T1 | DMYMAX |
| B | ###### | T1 | DMYMAX |

| HISTORY TABLE | | | |
|---|---|---|---|
| ROW | DATA | ROW BEGIN | ROW END |
|  |  |  |  |

FIG. 6

TIME23
ROW B IS DELETED FROM THE SYSTEM-PERIOD TEMPORAL TABLE — 64

| TRANSACTION MANAGEMENT TABLE | | | |
|---|---|---|---|
| T_ID | T_FIRST_TS | T_LAST_TS | T_COMMIT_TS |
| DMYMAX | $T_{MAX}$ | $T_{MAX}$ | $T_{MAX}$ |
| T1 | $T_{TIME12}$ | $T_{TIME13}$ | $T_{TIME14}$ |

70  72  74  76

| SYSTEM-PERIOD TEMPORAL TABLE | | | |
|---|---|---|---|
| ROW | DATA | ROW BEGIN | ROW END |
| A | @@@@@ | T2 | DMYMAX |

78  80  82  84

| HISTORY TABLE | | | |
|---|---|---|---|
| ROW | DATA | ROW BEGIN | ROW END |
| A | ******* | T1 | T2 |
| B | ###### | T1 | T2 |

TIMING-BASED SYSTEM-PERIOD TEMPORAL TABLE IN A DATABASE SYSTEM

BACKGROUND

The present exemplary embodiments pertain to database systems and more particularly to temporal databases such as a timing-based system-period temporal database.

A database may have rows of data while a temporal database qualifies each row of data with a time-based function such as a valid timestamp. A typical temporal database may include system-period temporal tables having a row designator, a row begin column and a row end column.

The row begin column may have the value of the system clock at the time when the first data change statement of a transaction was performed. In the same transaction, the same system clock value is set to a plurality of rows.

The row end column may be populated with the maximum value of the system clock.

Since the start of valid time of a row is determined by the timestamp of the first data change statement of the transaction, a discrepancy may be caused between the time of creation or determination of data and a query result. Odd results may be caused such as retrieval of data not yet inputted.

BRIEF SUMMARY

The various advantages and purposes of the exemplary embodiments as described above and hereafter are achieved by providing, according to an aspect of the exemplary embodiments, a timing-based system-period temporal table in a database system comprising: a transaction management table for transactions on data populated with a unique identifier of each transaction on data, a timestamp for a first operation of the each transaction, a timestamp for a last operation of the each transaction and a timestamp for a commit of the each transaction; and a system-period temporal table for data having at least one data row comprising a row identifier, a row begin entry denoted by the unique identifier for the transaction having performed the first operation of the transaction and a row end entry denoted by a dummy transaction identifier corresponding to a maximum timestamp value of the database system.

According to another aspect of the exemplary embodiments, there is provided a method of querying data in a timing-based system-period temporal table in a database system comprising: providing by the database system a transaction management table populated with columns for a unique identifier of each transaction, a timestamp for a first operation of the each transaction, a timestamp for a last operation of the each transaction and a timestamp for a commit of the each transaction; providing by the database system a system-period temporal table having columns for a row identifier, a row begin entry for each row denoted by the unique identifier for the each transaction having performed the first operation of the each transaction and a row end entry for each row denoted by a dummy transaction identifier corresponding to a maximum timestamp value of the database system; receiving by the database system a first transaction request; assigning by the database system a unique identifier to a first transaction corresponding to the first transaction request; performing by the database system a first operation of the first transaction at a first timestamp on data according to the first transaction; writing by the database system the first timestamp to a location separate from the system-period temporal table; writing by the database system a first row identifier in the system-period temporal table; writing by the database system in the row corresponding to the first row identifier the unique identifier of the first operation of the first transaction in the row begin entry of the system-period temporal table; writing by the database system in the row corresponding to the first row identifier a dummy transaction identifier corresponding to a maximum timestamp value of the database system in the row end entry of the system-period temporal table; committing by the database system the first transaction at a commit timestamp such that the commit timestamp is later than the first timestamp; inserting by the database system a row in the transaction management table and inserting values for the unique transaction identifier for the first transaction, the first timestamp of the first operation of the first transaction and the commit timestamp of the committing the transaction in the transaction management table; and querying by the database system the transaction management table and the system-period temporal table based on one or unique identifiers from the system-period temporal table and one or more timestamps from the transaction management table.

According to a further aspect of the exemplary embodiments, there is provided a method of querying data in a timing-based system-period temporal table in a database system comprising: providing by the database system a transaction management table populated with columns for a unique identifier of each transaction, a timestamp for a first operation of the each transaction, a timestamp for a last operation of the each transaction and a timestamp for a commit of the each transaction; providing by the database system a system-period temporal table having columns for a row identifier, a row begin entry for each row denoted by the unique identifier for the each transaction having performed an operation and a row end entry for each row denoted by a dummy transaction identifier corresponding to a maximum timestamp value of the database system; receiving by the database system a time-based query; combining by the database system the transaction management table and the system-period temporal table; retrieving by the database system timestamps from the transaction management table; comparing by the database system a time and period of the time-base query with the retrieved timestamps to arrive at a query result.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIGS. 4 to 11 illustrate an operational example of the exemplary embodiments which may include a transaction management table, a system-period temporal table and a history table.

DETAILED DESCRIPTION

Figure 1:
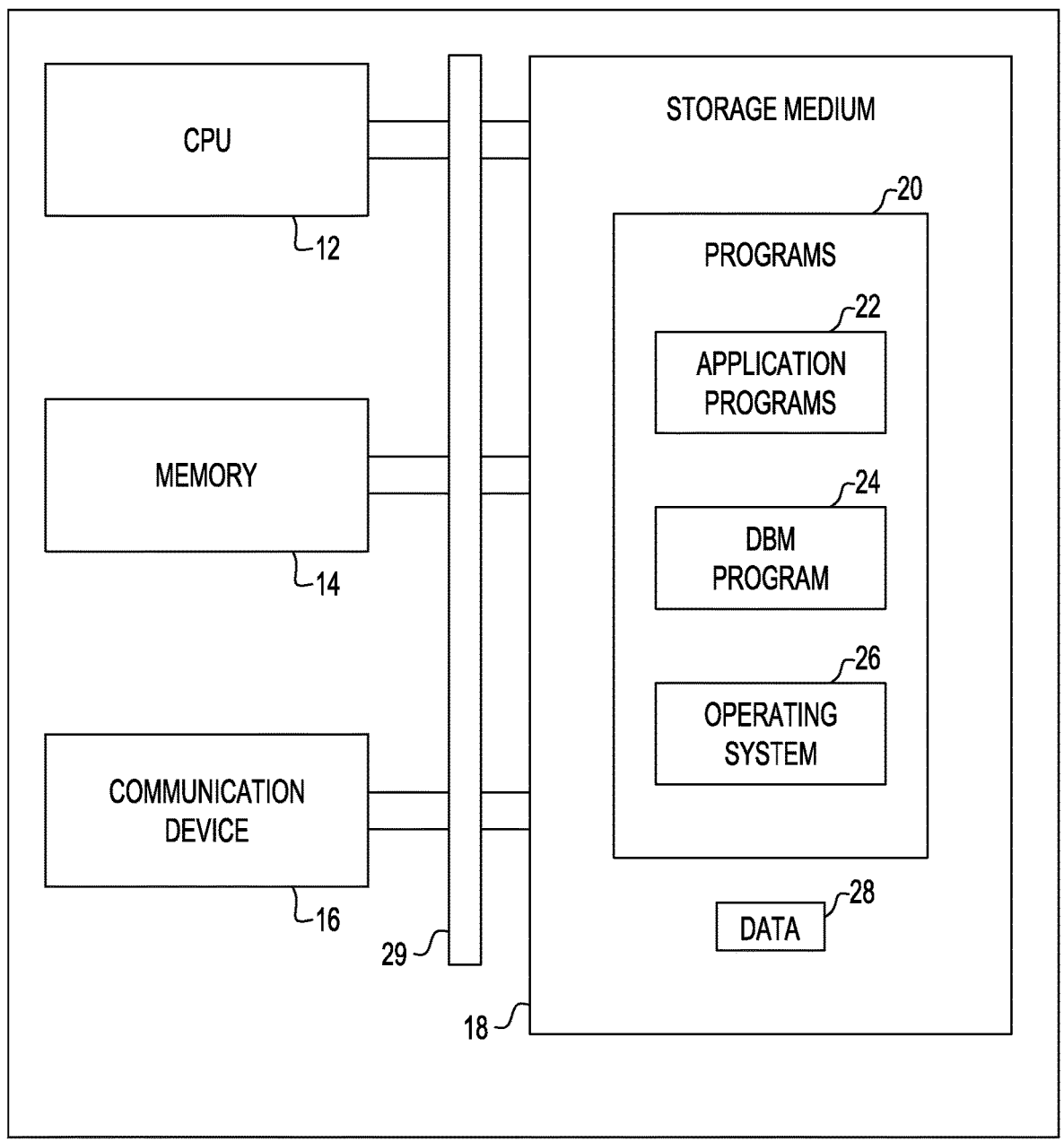
FIG. 1 is an exemplary embodiment of a database management system.

Referring to the Figures in more detail, and particularly referring to FIG. 1, there is illustrated an exemplary embodiment of a database management system (DBMS) 10 which may include a central processing unit (CPU) 12, memory 14 and a communication device 16 to communicate with other DBMSs (not shown) or to communicate with any other computing devices (not shown). The communication device 16 may communicate by any wired or wireless means including the internet, cloud, cell, satellite, WiFi and various area networks such as LAN and WAN.

The DBMS 10 may further include a storage medium 18 which may be non-transitory. The storage medium 18 may be located within DBMS 10 or may be located remotely such as network attached storage.

Located within the storage medium 18 may be programs 20 which may include various application programs 22, a database management (DBM) program 24 and an operating system 26. Other programs not listed and not germane to the exemplary embodiments may also be included within programs 20.

The storage medium 18 may further include persistent storage for data 28 that may be handled by the DBM program 24, operating system 26 or application programs 22.

Various input and output devices that may be used to input data to DBMS 10 are also not shown.

In operation, an application program in application programs 22 may provide a query to DBM program 24. The DBM program 24 may execute the query on tables stored in storage medium 18.

The exemplary embodiments enable a time-based query to be performed on the basis of not only the timestamp of the "first operation of a transaction", but also the timestamp of the "last operation of the transaction" as well as the "commit of the transaction". The exemplary embodiments allow for a time-based query on the basis of the time at which data have been determined (finalized). The exemplary embodiments ensure that the value for Row Begin is less than the value for Row End is always satisfied.

The exemplary embodiments disclose a method for time-based query of a temporal database on the basis of the time at which data have been manipulated by a transaction such as timestamp of a first operation on the data, timestamp of a last operation on the data or timestamp of a commit of the transaction.

The method may be performed by:
- a separate table managed by the system (i.e., a transaction management table) is populated with a "unique identifier of each transaction" and with the timestamps of the "first operation of the transaction", "last operation of the transaction", and "time of commit";
- setting "period start time" (Row Begin) column and "period end time" (i.e., Row End) column of a system-period temporal table (storing present and past data of the database) with a unique identifier of each transaction having performed an operation, instead of directly setting timestamps; and
- when a time-based query is executed, the query is executed on the basis of the timestamps (first operation, last operation or commit) retrieved from the transaction management table with the unique identifier of each transaction from the system-period temporal table.

A transaction in the present context is a sequence of database operations which the database system treats as a single unit. If all of the operations in the sequence are not completed, the transaction is rolled back by undoing all of the operations that did not complete.

A first operation of a transaction in the present context is the first data manipulation of a sequence of database operations which the database system treats as a single unit.

A last operation of a transaction in the present context is the last data manipulation of a sequence of database operations which the database system treats as a single unit. The last operation of a transaction occurs just before a commit of the transaction.

A commit of the transaction in the present context is the making permanent of a set of tentative changes propagated by the transaction. The opposite of commit is a rollback which is to discard the tentative changes.

In the exemplary embodiments, there are proposed a series of three tables, a transaction management table, a system-period temporal table and, in a preferred embodiment, a history table.

The transaction management table has at least the following columns:
- a unique transaction identifier (T_ID)
- a timestamp of the first data manipulation in the transaction (T_FIRST_TS)
- a timestamp of the last data manipulation in the transaction (T_LAST_TS)
- a timestamp at the time of commit (T_COMMIT_TS).

The transaction management table may have one dummy record, referenced for example as DMYMAX, having the maximum system timestamp, for example, 9999-12-30-00.00.00 as an end-of-transaction timestamp. For convenience, this maximum system timestamp may be referenced as $T_{MAX}$.

The system-period temporal table has at least the following columns:
- a Row identifier
- one or more columns of data
- a Row Begin identifier
- a Row End identifier.

Row Begin and Row End are set with a unique identifier of each transaction having performed an operation, instead of directly setting timestamps to them. The unique identifier of a transaction is determined at the time when the transaction starts, and thus the identifier can be set at the time of an operation on a row. The unique identifier may be automatically generated by the DBM program 24 or other part of the DBMS 10. Rows of the system-period temporal table are current data.

The history table has the same columns as the system-period temporal table. Upon an update to a row or the deletion of a row in the system-period temporal table, the original row is moved to the history table. The Row Begin in the history table is set with the transaction that initiated the row and the Row End in the history table is set with the transaction that updated or deleted the original row.

The following principles apply to processing of data at the time of data manipulation.

A transaction starts. The DBMS 10 generates a unique transaction identifier that is recorded in memory or a memory table that is separate from the transaction management table. Memory and memory table are collectively referred to hereafter as memory. The transaction may perform an insert operation on the data. If this is the first data manipulation in the transaction, T_FIRST_TS is set and T_LAST_TS is set with a timestamp of the insert operation and the T_FIRST_TS and T_LAST_TS values are recorded in memory.

The DBMS 10 performs the following setting to the row and inserts the row into the system-period temporal table. The Row Begin column is set with the unique transaction identifier for the inserted row. The Row End column is set with the DMYMAX transaction identifier. A timestamp of the update and/or delete operation is recorded in memory. Since the rows in the system-period temporal table are current data, there is no real end as the transaction is continuing so DMYMAX (having the maximum timestamp value) is set as the Row End unique transaction identifier.

The transaction may then perform an update and/or delete operation on the data. When the data manipulation is the first operation in the transaction, T_FIRST_TS is set and T_LAST_TS is set.

The DBMS 10 performs the following setting in the original data row and moves the original data row to the history table. The Row Begin column maintains the unique transaction identifier that caused the original row to be inserted. The Row End column is set with the unique transaction identifier of the transaction that performs the update or delete operation.

If an update of data is performed, an insertion operation is performed to insert the updated data into the system-period temporal table. The Row Begin column should record the transaction that caused the update operation.

Commit is performed for the transaction. T_COMMIT_TS is set with the timestamp of the commit operation and recorded in memory. At commit, a row is inserted into the transaction management table by the DBMS 10 and the unique transaction identifier of the transaction is inserted into the T_ID column. The DBMS 10 inserts timestamps (retrieved from memory) of the first data manipulation of the transaction (T_FIRST_TS), last data manipulation of the transaction (T_LAST_TS) and commit of the transaction (T_COMMIT_TS) into the transaction management table.

The processing of a query can proceed in the following manner.

At the time when a time-based query is executed, the query is executed on the basis of the timestamps retrieved by performing JOIN with the unique identifier of each transaction. With the JOIN command, the lines of files may be joined which share a common field of data.

The DBMS 10 rewrites a time-based query to UNION ALL. With the UNION ALL command, sets of data may be combined including any duplicates in the fields of data.

The DBMS 10 performs JOIN to the transaction management table and the system-period temporal table to retrieve either of the following timestamps with the unique transaction identifier set in Row Begin or Row End of the system-period temporal table, according to a global setting of the DBMS 10 or instruction from a user.

Timestamp of the first data manipulation by the transaction (T_FIRST_TS)

Timestamp of the last data manipulation by the transaction (T_LAST_TS)

Timestamp of the time of the commit (T_COMMIT_TS)

The retrieved timestamp of Row Begin or Row End and the time or period specified in the time-based query are compared to obtain a result of the time-based query.

Figure 2:
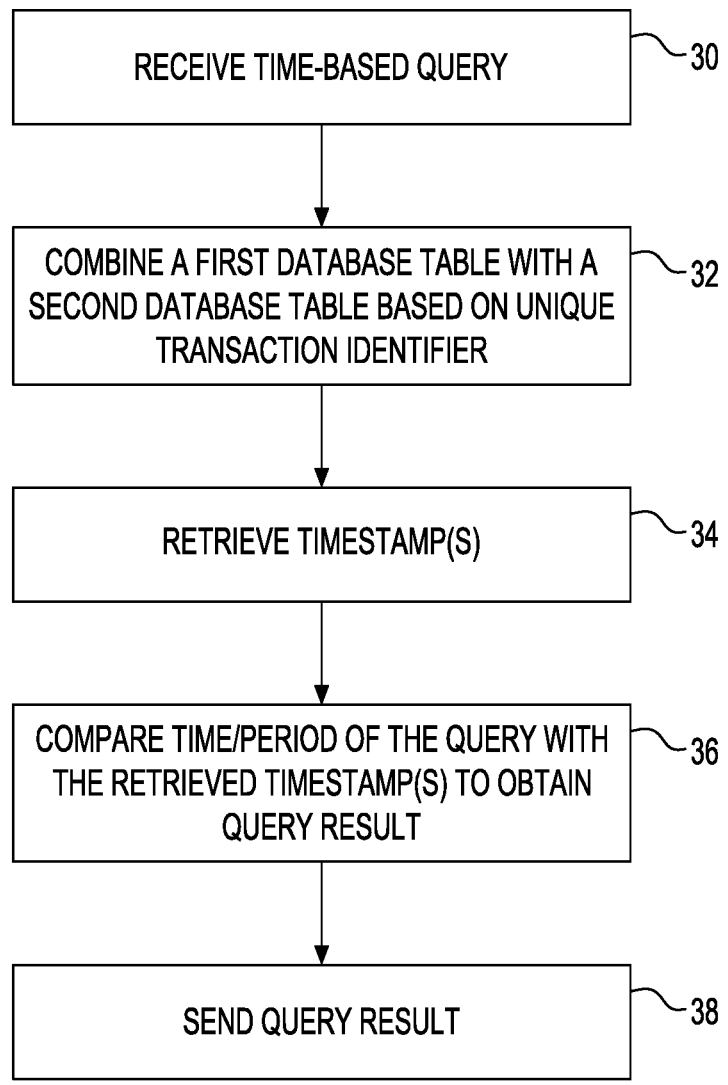
FIG. 2 is a flow chart illustrating a time-based query.

FIG. 2 is a flow chart illustrating the time-based query. A time-based query is received, box 30.

A first database table is combined with a second database table based on the unique transaction identifier, box 32. In one exemplary embodiment, one database table may be the transaction management table and the other database table may be the system-period temporal table. In another exemplary embodiments, one database table may be the transaction management table and the other database table may be the associated history table. In a further exemplary embodiment, one database table may be the transaction management table and the other may be the union (system-period temporal table and the associated history table). With the union operator, sets of data may be combined with any duplicate records being automatically removed The timestamps from the database table having the timestamps are retrieved, box 34. In one exemplary embodiment, the timestamps are retrieved from the transaction management table as the system-period temporal table does not have timestamps.

The time/period of the query is compared with the retrieved timestamps to obtain the query result, box 36.

The query result is then sent to the query requestor, box 38.

Figure 3:
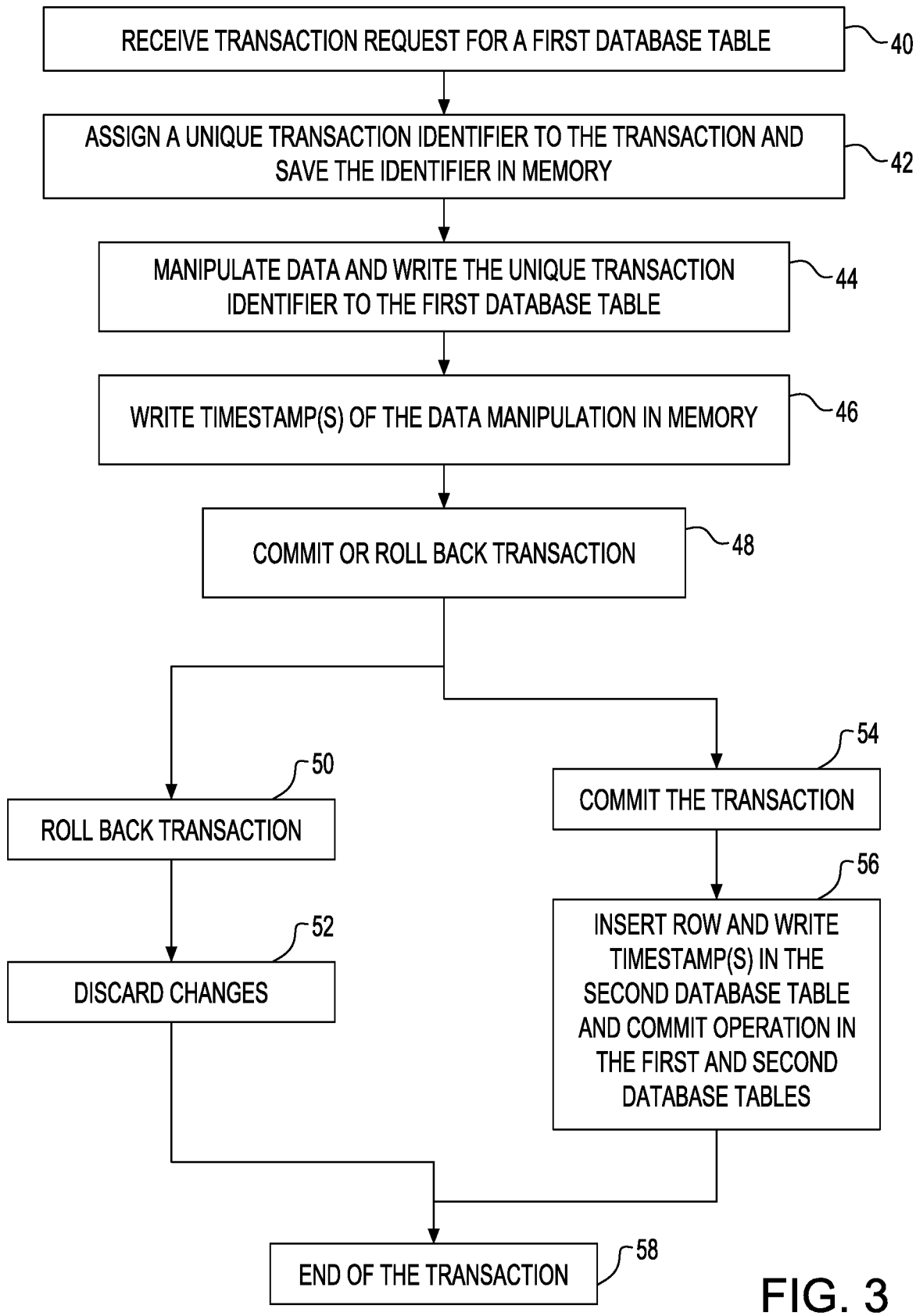
FIG. 3 is a flow chart illustrating the operation of the transaction management table and the system-period temporal table.

Referring now to FIG. 3, there is a flow chart illustrating the operation of the transaction management table and the system-period temporal table. The first database table may be the system-period temporal table and the second database table may be the transaction management table.

First, a transaction request is received for the system-period temporal table, box 40.

A unique transaction identifier is assigned to the transaction. The unique transaction identifier is saved in memory, box 42.

Data is then manipulated. The data manipulation may be, for example, by inserting, updating or deleting data. The unique transaction identifier for the data manipulation is written to the Row Begin of the system-period temporal table, box 44. The timestamp(s) of the data manipulation are written in memory, box 46. As noted previously, the timestamp(s) may be either the timestamp(s) of the first data manipulation by the transaction (T_FIRST_TS) or the timestamp(s) of the last data manipulation by the transaction (T_LAST_TS).

The transaction is either committed or rolled back, box 48. If the transaction is rolled back, the process follows the roll back path to roll back the transaction, box 50, and all changes to the transaction are discarded, box 52. The transaction is then ended, box 60.

If the transaction proceeds to commit, the process follows the commit path to commit the transaction, box 54.

Before the transaction has been committed, a new row in the transaction management table is inserted and the unique transaction identifier for the transaction is retrieved from memory and inserted in the T_ID column. The DBMS 10 inserts into the transaction management table timestamps (retrieved from memory) of the first data manipulation of the transaction (T_FIRST_TS), last data manipulation of the transaction (T_LAST_TS) and commit of the transaction (T_COMMIT_TS) into the transaction management table and the DBMS 10 may indicate that the rows in the system-period temporal table corresponding to the transaction and the row in the transaction management table have been committed, box 56.

Operations of the system-period temporal table and the transaction management table during commit occur as one commit transaction as indicated in box 56. The reason for the sequence of operations during commit is for consistency of data. If commitment for the system-period temporal table is done but the row insert or commitment for the transaction management table fails, the DBMS 10 cannot retrieve timestamps for rows in the system-period temporal table. In the case where row insert in the transaction management table fails, changes to the system-period temporal table should not be committed and should be rolled back.

The transaction is then ended, box 58.

An operational example of the exemplary embodiments is illustrated in FIGS. 4 to 11. In each of FIGS. 4 to 11, there is included a transaction management table 64 and a system-period temporal table 66. In a preferred exemplary embodiment, there may also be a history table 68.

The transaction management table 64 has a column 70 for a unique transaction identifier T_ID, a column 72 for a timestamp of the first data manipulation by the transaction T_FIRST_TS, a column 74 for a timestamp of the last data manipulation by the transaction T_LAST_TS and a column 76 for a timestamp of the time of the commit T_COMMIT_TS.

The system-period temporal table 66 has a column 78 for a data row identifier, one or more columns 80 for data, a column 82 for Row Begin and a column 84 for Row End.

In a preferred exemplary embodiment where there is a history table 68, the history table 68 may have the same columns as the system-period temporal table 66. That is, the history table 68 may have a column 86 for a data row identifier, one or more columns 88 for data, a column 90 for Row Begin and a column 92 for Row End.

Figure 4:
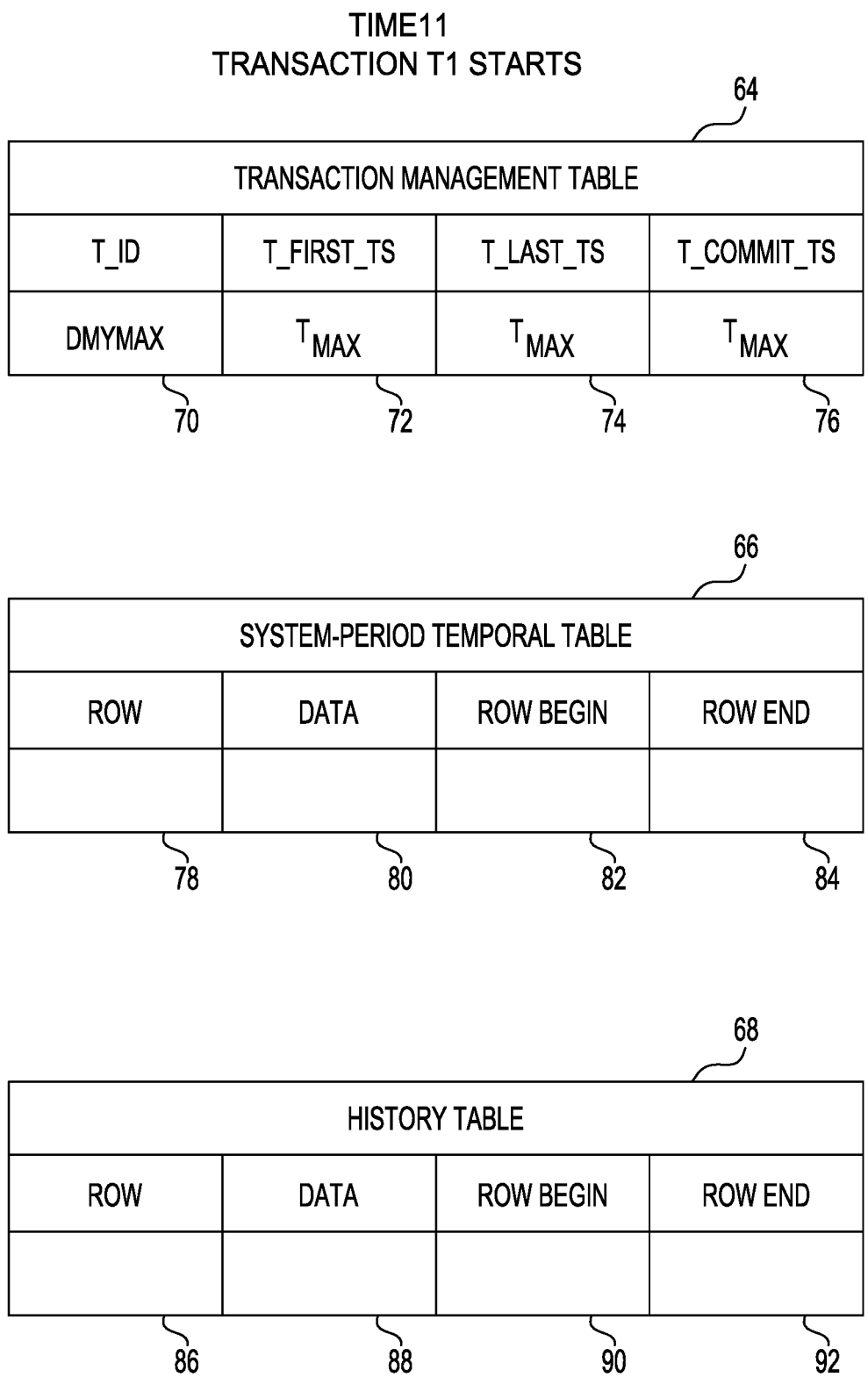

Referring now specifically to FIG. 4, a transaction T1 starts at time11. The unique transaction identifier T1 is stored in memory. The transaction management table 64 may have a dummy entry with a dummy entry for T_ID. For purposes of illustration and not limitation, the T_ID for the dummy entry may be DMYMAX. The dummy entry may have a T_FIRST_TS of $T_{MAX}$, a T_LAST_TS of $T_{MAX}$ and a T_COMMIT_TS of $T_{MAX}$ where $T_{MAX}$ may be the maximum value of the system clock.

Referring now to FIG. 5, row A of data has been added by transaction T1 at time12 and has been inserted into the system period temporal table 66. In memory, T_FIRST_TS for transaction T1 is set with the current time, $T_{TIME12}$. Since this is also the first operation for transaction T1, T_LAST_TS for transaction T1 has been set with the current time, $T_{TIME12}$.

In the system-period temporal table 66, row A is inserted and given the identifier "A" in the row column 78. The Row Begin column 82 is set with the unique transaction identifier T1 which added row A and the Row End column 84 is set with the T_ID for the dummy transaction DMYMAX.

Referring now to FIG. 6, row B of data has been added by transaction T1 at time13 and has been inserted into the system period temporal table 66. In memory, T_LAST_TS for transaction T1 has been set with the current time, $T_{TIME13}$.

In the system-period temporal table 66, row B is inserted and given the identifier "B" in the row column 78. The Row Begin column 82 is set with the unique transaction identifier T1 which added row B and the Row End column 84 is set with the T_ID for the dummy transaction DMYMAX.

Figure 7:
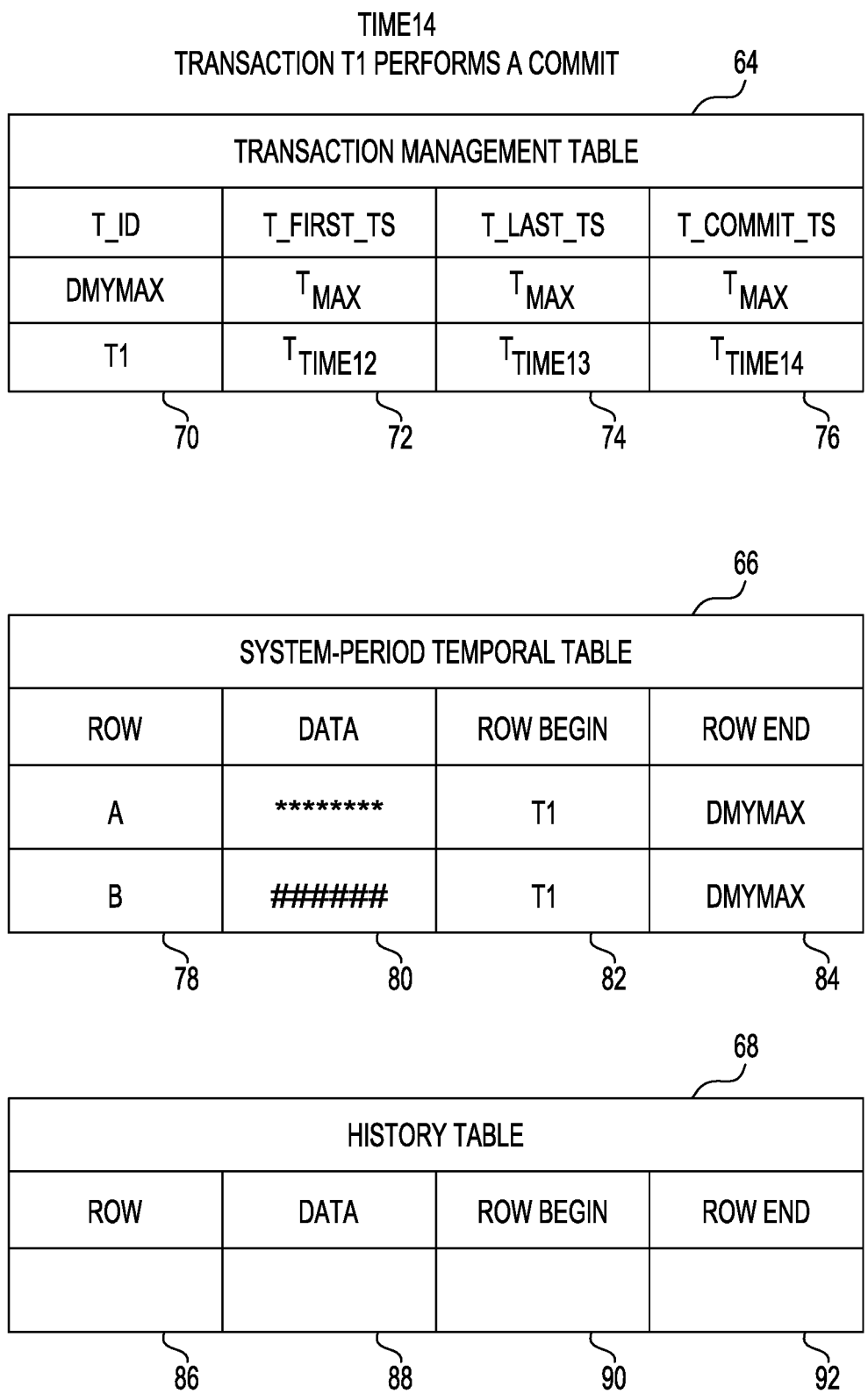

Referring now to FIG. 7, transaction T1 performs a commit at time T14. In the transaction management table 64, a row for transaction T1 is inserted and the unique transaction identifier T1 is entered in the column T_ID 70. Values for T_FIRST_TS, T_LAST_TS AND T_COMMIT_TS are entered into columns 72, 74, 76, respectively. T_FIRST_TS is the timestamp $T_{TIME12}$ for when row A is first inserted which is the first manipulation of the data in transaction T1. T_LAST_TS is the timestamp $T_{TIME13}$ for when row B is inserted which is the last manipulation of the data in transaction T1. T_COMMIT_TS is set with the current time, $T_{TIME14}$.

In the system-period temporal table 66, a commit is performed for row A and row B.

Figure 8:
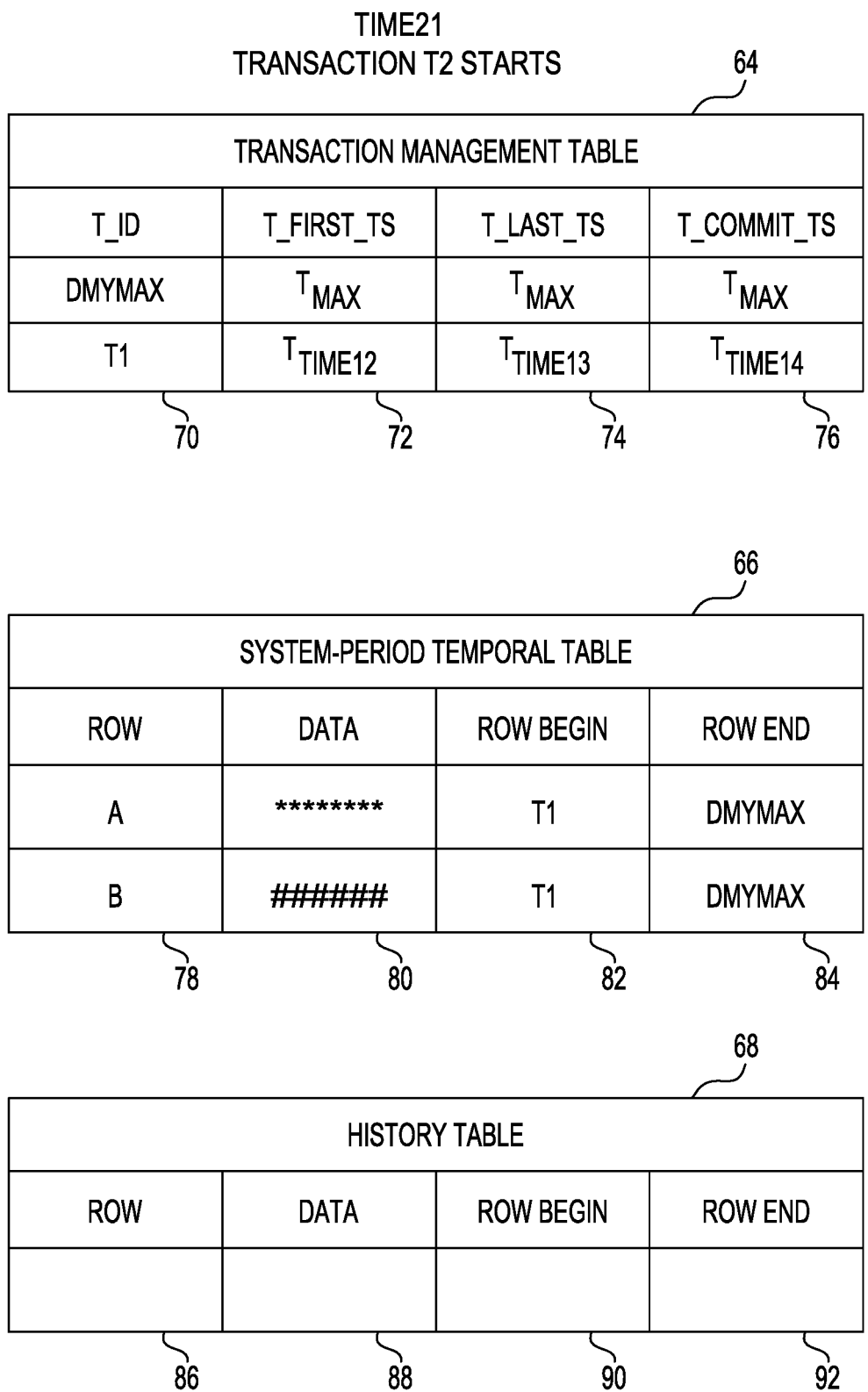

Referring now to FIG. 8, a transaction T2 starts at time21.

Memory records the unique transaction identifier T2 for transaction T2.

Figure 9:
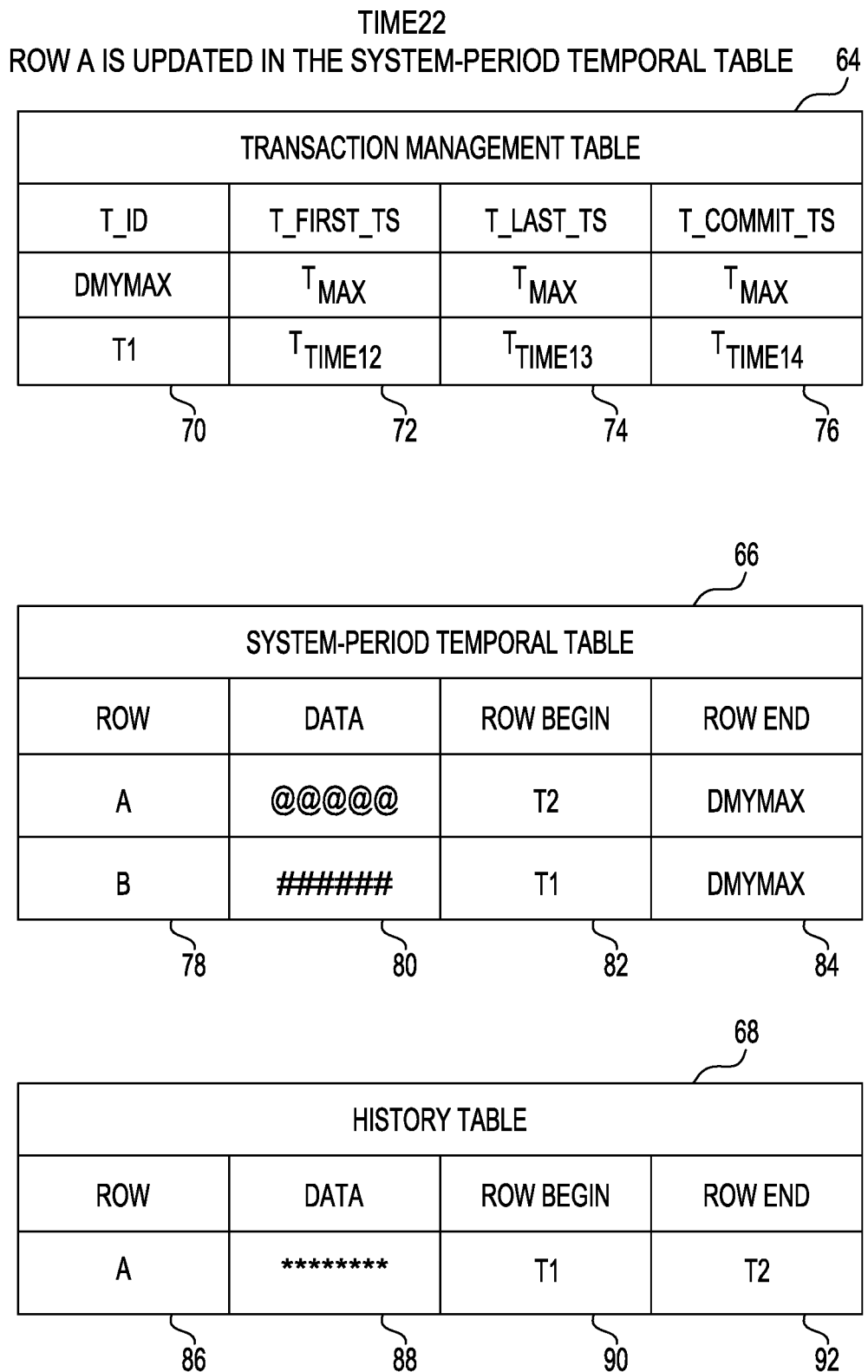

Referring now to FIG. 9, row A of data has been updated by transaction T2 at time22 and has been inserted into the system period temporal table 66. Note that the data indicia in data column 80 of the system-period temporal table 66 for row A has been changed to indicate that the data in row A has been changed, in this case updated. In memory, T_FIRST_TS for transaction T2 is set with the current time, $T_{TIME22}$. Since this is also the first operation for transaction T2, T_LAST_TS for transaction T2 has been set in memory with the current time, $T_{TIME22}$.

In the system-period temporal table 66, the original row A has been deleted and has been inserted in the history table 68 with the Row End column 92 set with transaction T2. In the system-period temporal table 66, an updated row A is inserted and given the identifier "A" in the row column 78. The Row Begin column 82 is set with the unique transaction identifier T2 which updated row A and the Row End column 84 is set with the T_ID for the dummy transaction DMYMAX.

Referring now to FIG. 10, row B has been deleted by transaction T2 at time23.

In memory, T_LAST_TS for transaction T2 has been set with the current time $T_{TIME23}$.

In the system-period temporal table 66, row B has been deleted. The deleted row B is inserted into the history table 68. In row B in the history table 68, column 92 for Row End is set with transaction T2.

Figure 11:
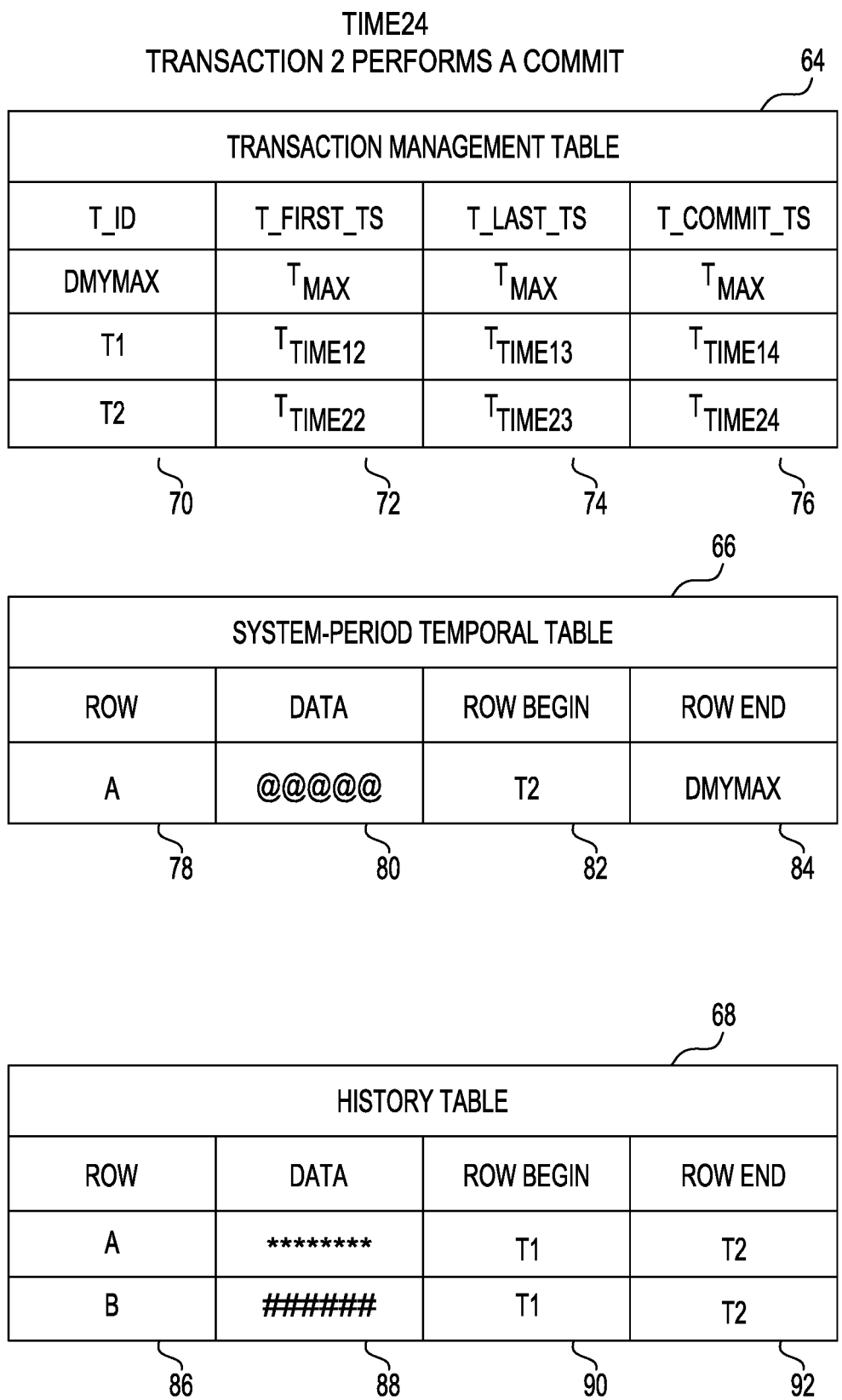

Referring now to FIG. 11, transaction T2 performs a commit at time T24. In the transaction management table 64, a row for transaction T2 is inserted and the unique transaction identifier T2 is entered in the column T_ID 70. Values for T_FIRST_TS, T_LAST_TS AND T_COMMIT_TS are entered into columns 72, 74, 76, respectively. T_FIRST_TS is the timestamp $T_{TIME22}$ for when row A is updated which is the first manipulation of the data in transaction T2. T_LAST_TS is the timestamp $T_{TIME23}$ for when row B is deleted which is the last manipulation of the data in transaction T1. In row T2 of the transaction management table 64, the column 76 for T_COMMIT_TS is set with the current time, $T_{TIME24}$.

In the system-period temporal table 66, a commit is performed for row A.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of querying data in a database system comprising:
providing by the database system a transaction management table populated with columns for a unique identifier of each transaction, a timestamp for a first operation of the each transaction, a timestamp for a last operation of the each transaction and a timestamp for a commit of the each transaction;
providing by the database system a system-period temporal table having columns for a row identifier, a row begin entry for each row denoted by the unique identifier for the each transaction having performed the first operation of the each transaction and a row end entry for each row denoted by a dummy transaction identifier corresponding to a maximum timestamp value of the database system;
receiving by the database system a first transaction request;

assigning by the database system a unique identifier to a first transaction corresponding to the first transaction request;

performing by the database system a first operation of the first transaction at a first timestamp on data according to the first transaction;

writing by the database system the first timestamp to a location separate from the system-period temporal table;

writing by the database system a first row identifier in the system-period temporal table;

writing by the database system in the row corresponding to the first row identifier the unique identifier of the first operation of the first transaction in the row begin entry of the system-period temporal table;

writing by the database system in the row corresponding to the first row identifier a dummy transaction identifier corresponding to a maximum timestamp value of the database system in the row end entry of the system-period temporal table;

committing by the database system the first transaction at a commit timestamp such that the commit timestamp is later than the first timestamp;

inserting by the database system a row in the transaction management table and inserting values for the unique transaction identifier for the first transaction, the first timestamp of the first operation of the first transaction and the commit timestamp of the committing the transaction in the transaction management table; and querying by the database system the transaction management table and the system-period temporal table based on one or unique identifiers from the system-period temporal table and one or more timestamps from the transaction management table.

2. The method of claim 1 further comprising providing a history table for data that has been updated in, or deleted from, the system-period temporal table by the transaction or a subsequent transaction, the history table having a row identifier, a row begin entry denoted by the unique identifier for the transaction having performed an operation and a row end entry denoted by a unique identifier for the transaction, or the unique identifier for the subsequent transaction, having performed the update or delete operation.

3. The method of claim 1 wherein the first operation of the first transaction is also the last operation of the first transaction and the last operation of the first transaction has the first timestamp.

4. The method of claim 1 further comprising:
performing by the database system a last operation of the first transaction at a second timestamp on data according to the first transaction such that the second timestamp is later than the first timestamp and earlier than the commit timestamp; and writing by the database system the second timestamp to the location separate from the system-period temporal table.

5. The method of claim 1 further comprising:
receiving by the database system a second transaction request;

assigning by the database system a unique identifier to a second transaction corresponding to the second transaction request;

performing by the database system a first operation of the second transaction at a first timestamp on data according to the second transaction;

writing by the database system the first timestamp of the second transaction to a location separate from the system-period temporal table;

writing by the database system a second row identifier in the system-period temporal table;

writing by the database system in the row corresponding to the second row identifier the unique identifier of the first operation of the second transaction in the row begin entry of the system-period temporal table;

writing by the database system in the row corresponding to the second row identifier a dummy transaction identifier corresponding to a maximum timestamp value of the database system in the row end entry of the system-period temporal table;

committing by the database system the second transaction at a commit timestamp such that the commit timestamp of the second transaction is later than the first timestamp of the second transaction; and inserting by the database system a second row in the transaction management table and inserting values for the unique transaction identifier for the second transaction, the first timestamp of the first operation of the second transaction and the commit timestamp of the committing the transaction in the transaction management table.

6. The method of claim 1 wherein:
inserting by the database system the row in the transaction management table and inserting values for the unique transaction identifier for the first transaction, the first timestamp of the first operation of the first transaction and the commit timestamp of the committing the transaction in the transaction management table occurs only after committing by the database system the first transaction.

7. The method of claim 1 further comprising:
receiving by the database system a second transaction request;

assigning by the database system a unique identifier to a second transaction corresponding to the second transaction request;

performing by the database system a first operation of the second transaction at a first timestamp on data according to the second transaction wherein the first operation is updating the data in the row corresponding to the first row identifier;

writing by the database system the first timestamp of the second transaction to a location separate from the system-period temporal table;

writing by the database system in the row corresponding to the first row identifier the unique identifier of the first operation of the second transaction in the row begin entry of the system-period temporal table;

committing by the database system the second transaction at a commit timestamp such that the commit timestamp of the second transaction is later than the first timestamp of the second transaction; and inserting by the database system a second row in the transaction management table and inserting values for the unique transaction identifier for the second transaction, the first timestamp of the first operation of the second transaction and the commit timestamp of the committing the transaction in the transaction management table.

8. The method of claim 7 further comprising providing a history table for data that has been updated in the system-period temporal table by the second transaction, the history table having a first row identifier, a row begin entry denoted by the unique identifier for the first transaction having performed an operation and a row end entry denoted by a unique identifier for the second transaction having performed the update operation.

9. The method of claim 1 further comprising:
receiving by the database system a second transaction request;
assigning by the database system a unique identifier to a second transaction corresponding to the second transaction request;
performing by the database system a first operation of the second transaction at a first timestamp on data according to the second transaction wherein the first operation is deleting the data in the row corresponding to the first row identifier;
writing by the database system the first timestamp of the second transaction to a location separate from the system-period temporal table;
committing by the database system the second transaction at a commit timestamp such that the commit timestamp of the second transaction is later than the first timestamp of the second transaction; and
inserting by the database system a second row in the transaction management table and inserting values for the unique transaction identifier for the second transaction, the first timestamp of the first operation of the second transaction and the commit timestamp of the committing the transaction in the transaction management table.

10. The method of claim 7 further comprising providing a history table for data that has been deleted in the system-period temporal table by the second transaction, the history table having a first row identifier, a row begin entry denoted by the unique identifier for the first transaction having performed an operation and a row end entry denoted by a unique identifier for the second transaction having performed the delete operation.

11. A method of querying data in a database system comprising:
providing by the database system a transaction management table populated with columns for a unique identifier of each transaction, a timestamp for a first operation of the each transaction, a timestamp for a last operation of the each transaction and a timestamp for a commit of the each transaction;
providing by the database system a system-period temporal table having columns for a row identifier, a row begin entry for each row denoted by the unique identifier for the each transaction having performed an operation and a row end entry for each row denoted by a dummy transaction identifier corresponding to a maximum timestamp value of the database system;
receiving by the database system a time-based query;
combining by the database system the transaction management table and the system-period temporal table;
retrieving by the database system timestamps from the transaction management table;
comparing by the database system a time and period of the time-based query with the retrieved timestamps and with the unique identifier of each transaction from the system-period temporal table, the comparing generates a query result.

12. The method of claim 11 further comprising:
receiving by the database system a first transaction request;
assigning by the database system a unique identifier to a first transaction corresponding to the first transaction request;
performing by the database system a first operation of the first transaction at a first timestamp on data according to the first transaction;
writing by the database system the first timestamp to a location separate from the system-period temporal table;
writing by the database system a first row identifier in the system-period temporal table;
writing by the database system in the row corresponding to the first row identifier the unique identifier of the first operation of the first transaction in the row begin entry of the system-period temporal table;
writing by the database system in the row corresponding to the first row identifier a dummy transaction identifier corresponding to a maximum timestamp value of the database system in the row end entry of the system-period temporal table;
committing by the database system the first transaction at a commit timestamp such that the commit timestamp is later than the first timestamp; and
inserting by the database system a row in the transaction management table and inserting values for the unique transaction identifier for the first transaction, the first timestamp of the first operation of the first transaction and the commit timestamp of the committing the transaction in the transaction management table.

13. The method of claim 12 further comprising providing a history table for data that has been updated in, or deleted from, the system-period temporal table by the transaction or a subsequent transaction, the history table having a row identifier, a row begin entry denoted by the unique identifier for the transaction having performed an operation and a row end entry denoted by a unique identifier for the transaction, or the unique identifier for the subsequent transaction, having performed the update or delete operation.

14. The method of claim 12 further comprising:
performing by the database system a last operation of the first transaction at a second timestamp on data according to the first transaction such that the second timestamp is later than the first timestamp and earlier than the commit timestamp; and
writing by the database system the second timestamp to the location separate from the system-period temporal table.

15. The method of claim 12 further comprising:
receiving by the database system a second transaction request;
assigning by the database system a unique identifier to a second transaction corresponding to the second transaction request;
performing by the database system a first operation of the second transaction at a first timestamp on data according to the second transaction;
writing by the database system the first timestamp of the second transaction to a location separate from the system-period temporal table;
writing by the database system a second row identifier in the system-period temporal table;
writing by the database system in the row corresponding to the second row identifier the unique identifier of the first operation of the second transaction in the row begin entry of the system-period temporal table;
writing by the database system in the row corresponding to the second row identifier a dummy transaction identifier corresponding to a maximum timestamp value of the database system in the row end entry of the system-period temporal table;

committing by the database system the second transaction at a commit timestamp such that the commit timestamp of the second transaction is later than the first timestamp of the second transaction; and inserting by the database system a second row in the transaction management table and inserting values for the unique transaction identifier for the second transaction, the first timestamp of the first operation of the second transaction and the commit timestamp of the committing the transaction in the transaction management table.

16. The method of claim 12 wherein:

inserting by the database system the row in the transaction management table and inserting values for the unique transaction identifier for the first transaction, the first timestamp of the first operation of the first transaction and the commit timestamp of the committing the transaction in the transaction management table occurs only after committing by the database system the first transaction.

17. The method of claim 12 further comprising:

receiving by the database system a second transaction request;

assigning by the database system a unique identifier to a second transaction corresponding to the second transaction request;

performing by the database system a first operation of the second transaction at a first timestamp on data according to the second transaction wherein the first operation is updating the data in the row corresponding to the first row identifier;

writing by the database system the first timestamp of the second transaction to a location separate from the system-period temporal table;

writing by the database system in the row corresponding to the first row identifier the unique identifier of the first operation of the second transaction in the row begin entry of the system-period temporal table;

committing by the database system the second transaction at a commit timestamp such that the commit timestamp of the second transaction is later than the first timestamp of the second transaction; and inserting by the database system a second row in the transaction management table and inserting values for the unique transaction identifier for the second transaction, the first timestamp of the first operation of the second transaction and the commit timestamp of the committing the transaction in the transaction management table.

18. The method of claim 12 further comprising:

receiving by the database system a second transaction request;

assigning by the database system a unique identifier to a second transaction corresponding to the second transaction request;

performing by the database system a first operation of the second transaction at a first timestamp on data according to the second transaction wherein the first operation is deleting the data in the row corresponding to the first row identifier;

writing by the database system the first timestamp of the second transaction to a location separate from the system-period temporal table;

committing by the database system the second transaction at a commit timestamp such that the commit timestamp of the second transaction is later than the first timestamp of the second transaction; and inserting by the database system a second row in the transaction management table and inserting values for the unique transaction identifier for the second transaction, the first timestamp of the first operation of the second transaction and the commit timestamp of the committing the transaction in the transaction management table.

* * * * *